US009724886B2

(12) United States Patent
Bignogno et al.

(10) Patent No.: US 9,724,886 B2
(45) Date of Patent: Aug. 8, 2017

(54) PROCESS AND APPARATUS FOR MANUFACTURING PNEUMATIC TYRES FOR VEHICLE WHEELS

(75) Inventors: Mauro Bignogno, Milan (IT); Gianni Portinari, Milan (IT); Pietro Dale', Milan (IT)

(73) Assignee: PIRELLI TYRE S.P.A., Milano (IT)

( * ) Notice: Subject to any disclaimer, the term of this patent is extended or adjusted under 35 U.S.C. 154(b) by 585 days.

(21) Appl. No.: 14/009,910

(22) PCT Filed: Apr. 18, 2012

(86) PCT No.: PCT/IB2012/051932
§ 371 (c)(1),
(2), (4) Date: Oct. 4, 2013

(87) PCT Pub. No.: WO2012/147012
PCT Pub. Date: Nov. 1, 2012

(65) Prior Publication Data
US 2014/0034221 A1    Feb. 6, 2014

Related U.S. Application Data

(60) Provisional application No. 61/484,419, filed on May 10, 2011.

(30) Foreign Application Priority Data

Apr. 29, 2011  (IT) ............... MI2011A0721

(51) Int. Cl.
*B29D 30/32*    (2006.01)
*B29D 30/12*    (2006.01)
(Continued)

(52) U.S. Cl.
CPC ........... *B29D 30/12* (2013.01); *B29D 30/245* (2013.01); *B29D 30/246* (2013.01); *B29D 30/36* (2013.01);
(Continued)

(58) Field of Classification Search
CPC ...... B29D 30/18; B29D 30/32; B29D 30/245; B29D 30/246; B29D 30/36; B29D 2030/3257; B29D 2030/3264
See application file for complete search history.

(56) References Cited

U.S. PATENT DOCUMENTS 3,772,125 A * 11/1973 Leblond ............... B29D 30/248
156/132
4,711,691 A * 12/1987 Menell ................. B29D 30/248
156/415

(Continued)

FOREIGN PATENT DOCUMENTS

FR    2350947    * 12/1977 ............. B29D 30/32
RU    2009041    *  3/1994 ............. B29D 30/18

(Continued)

OTHER PUBLICATIONS

Machine generated English language translation of RU 2009041 (original document dated Mar. 1994).*

(Continued)

*Primary Examiner* — Martin Rogers
(74) *Attorney, Agent, or Firm* — Finnegan, Henderson, Farabow, Garrett & Dunner, L.L.P.

(57) ABSTRACT

In a process for building tires for vehicle wheels, a carcass sleeve is arranged on a shaping drum including two half-drums and two supports. Each support is operatively associated with one of the half-drums and carries a plurality of turning-up levers having free ends positioned close to the respective half-drum. Two annular anchoring structures are disposed around the carcass sleeve and each of the two supports is locked to the respective half-drum by interposing only stiff mechanical elements in mutual contact between the support and the half-drum. The carcass sleeve is shaped in a toroidal conformation, by setting a threaded shaft in rotation and moving the half-drums dose to each other.

(Continued)

Subsequently, each of the two supports is unlocked from the respective half-drum and the threaded shaft is set in rotation to move each support close to the respective half-drum and lift up the free ends of the turning-up levers until the end flaps of the carcass sleeve are turned up around the annular anchoring structures.

12 Claims, 10 Drawing Sheets

(51) Int. Cl.
*B29D 30/24* (2006.01)
*B29D 30/36* (2006.01)
(52) U.S. Cl.
CPC ............... *B29D 2030/3257* (2013.01); *B29D 2030/3264* (2013.01)

(56) References Cited

U.S. PATENT DOCUMENTS

| | | | | |
|---|---|---|---|---|
| 5,354,405 | A * | 10/1994 | Byerley | B29D 30/247 156/398 |
| 6,457,505 | B1 * | 10/2002 | Byerley | B29D 30/246 156/136 |
| 6,585,022 | B1 * | 7/2003 | Rex | B29D 30/246 156/401 |
| 7,101,451 | B2 * | 9/2006 | Žemla | B29D 30/245 156/131 |
| 2004/0250941 | A1 * | 12/2004 | Jungk | B29D 30/244 156/132 |
| 2006/0102272 | A1 | 5/2006 | Iyanagi et al. | |
| 2006/0137825 | A1 * | 6/2006 | Roedseth | B29D 30/245 156/415 |
| 2006/0180263 | A1 * | 8/2006 | Takasuka | B29D 30/32 156/130.7 |
| 2010/0000662 | A1 * | 1/2010 | Onimatsu | B29D 30/245 156/132 |
| 2010/0122775 | A1 * | 5/2010 | De Graaf | B29D 30/32 156/415 |
| 2012/0037298 | A1 | 2/2012 | De Graaf | |

FOREIGN PATENT DOCUMENTS

| | | | |
|---|---|---|---|
| SU | 387546 A3 | 6/1973 | |
| SU | 1281440 * | 1/1987 | ............. B29D 30/20 |
| WO | WO 2009/070020 A1 | 6/2009 | |
| WO | WO 2009/142482 A1 | 11/2009 | |
| WO | WO 2011/019272 A1 | 2/2011 | |

OTHER PUBLICATIONS

Mcahine generated English language translation of FR 2350947 (original document dated Dec. 1977).*
Machine generated English language translaton of SU 1281440 (original document dated Jan. 1987).*
International Search Report from the European Patent Office for International Application No. PCT/IB2012/051932, mailing date Aug. 31, 2012.
Written Opinion of the International Searching Authority from the European Patent Office for International Application No. PCT/IB2012/051932, mailing date Aug. 31, 2012.
English-language translation of Decision on Grant Patent for Invention issued in Russian counterpart Application No. 2013151907/05(080940).

* cited by examiner

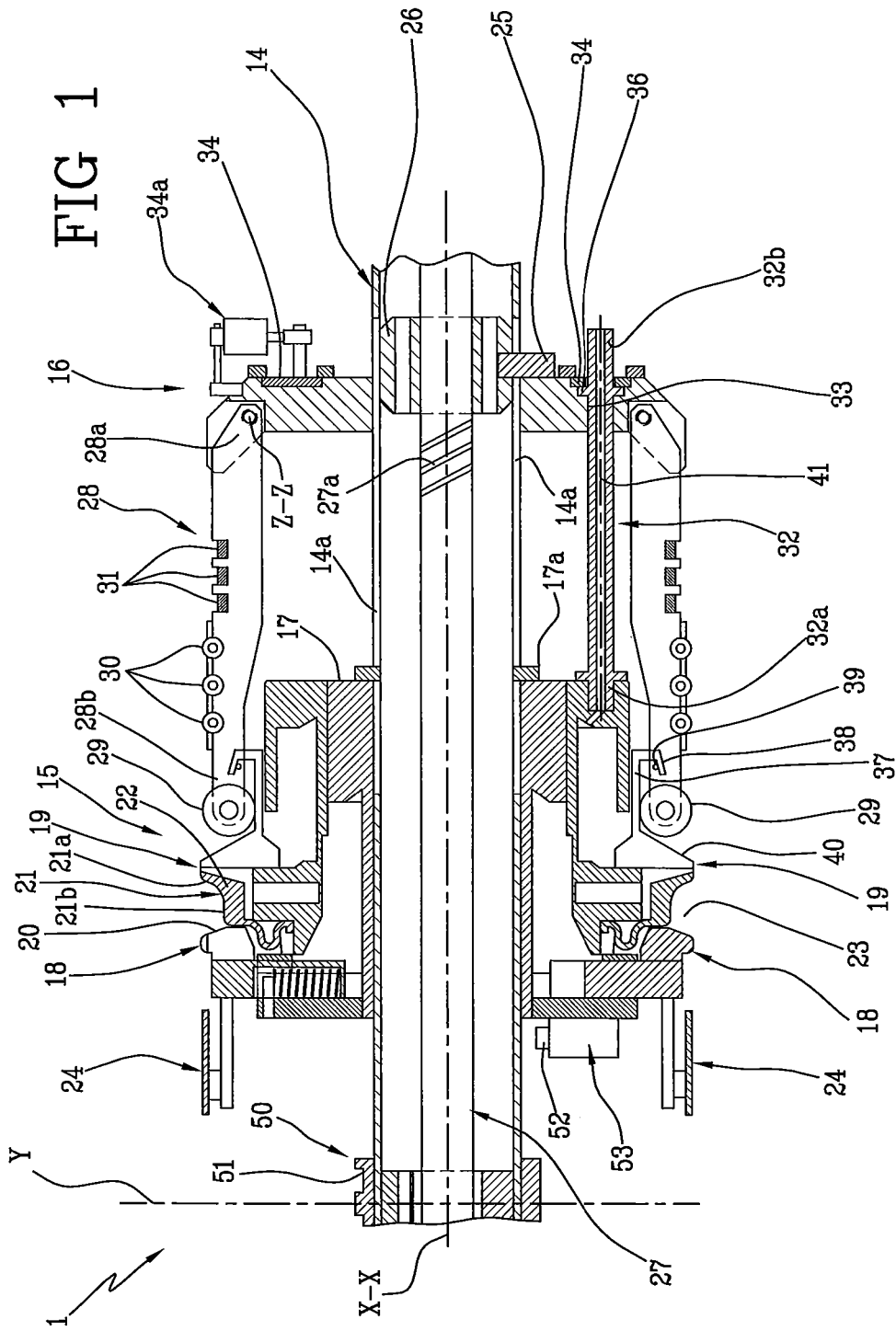

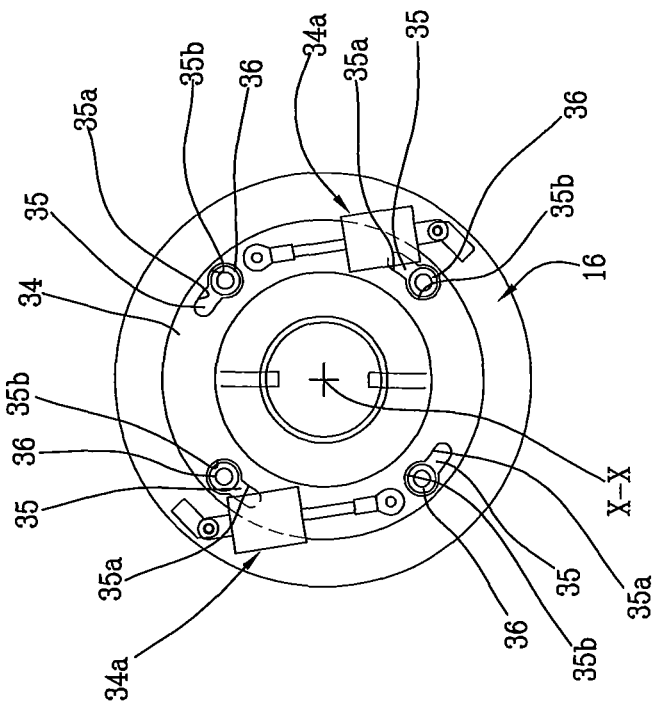
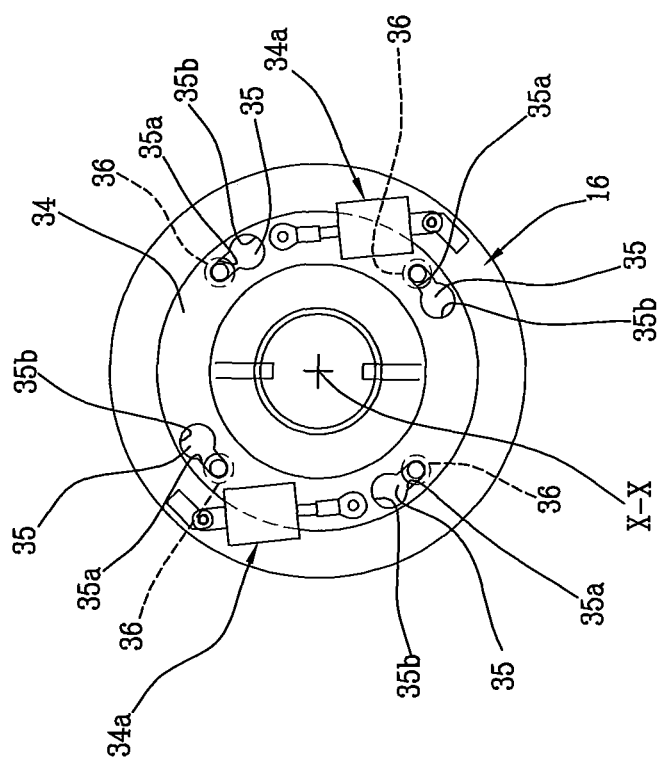

PROCESS AND APPARATUS FOR MANUFACTURING PNEUMATIC TYRES FOR VEHICLE WHEELS

CROSS REFERENCE TO RELATED APPLICATIONS

This application is a national phase application based on PCT/IB2012/051932, filed Apr. 18, 2012, which claims the priority of Italian Patent Application MI2011A000721 filed Apr. 29, 2011, and the benefit of U.S. Provisional Application No. 61/484,419, filed May 10, 2011, the content of each application being incorporated herein by reference.

FIELD OF THE INVENTION

The present invention relates to a process and an apparatus for building tyres for vehicle wheels.

A tyre for vehicle wheels generally comprises a carcass structure including at least one carcass ply having respectively opposite end flaps in engagement with respective annular anchoring structures, usually referred to as "bead cores", integrated into the regions usually identified as "beads", having an inner diameter substantially corresponding to a so-called "fitting diameter" of the tyre on a respective mounting rim.

More particularly, the present invention pertains to a process and an apparatus for building tyres, preferably for trucks, carried out through assembly of a carcass sleeve on a first-stage drum and subsequent transfer of the same carcass sleeve to a second-stage drum. On the aforesaid second-stage drum the bead cores are applied, the carcass sleeve is conveniently shaped until making it adhere to a radially external belt package and the end flaps of the carcass sleeve are turned up around the bead cores.

In the present specification and in the appended claims, by "mechanical locking and unlocking device" it is intended a device that in the locked configuration prevents the relative displacement between a mechanical element, preferably a lead screw nut, and a half-drum through coupling or interference of exclusively mechanical elements in mutual contact and interposed between said lead screw nut and the half-drum, without such a locking action relying on gases or liquids under pressure that by their being incompressible counteract and prevent the relative motion.

In other words, the exchange of forces between said half-drum and mechanical element capable of preventing the relative motion thereof exclusively takes place by means of stiff mechanical elements and not by hydraulic and/or pneumatic forces while the actuators enabling passage between the locked configuration and unlocked configured can on the contrary be of any nature (hydraulic, pneumatic, electromagnetic actuators, etc.).

BACKGROUND ART

Document WO 2009/142482 discloses a second-stage drum for building tyres comprising a central shaft, a threaded shaft disposed on the central shaft and two half-drums. On both sides of the assembly defined by the two half-drums, a lead screw nut is coupled to the threaded shaft. Each lead screw nut is connected to the respective half-drum through a connecting element. Each half-drum is provided with a turning-up unit, comprising a turning-up lever, and a clamping unit for the bead core. The clamping unit is disposed on a cylindrical portion of the half-drum having a slot receiving the mentioned connecting element. The cylindrical portion further comprises a chamber inside which a pneumatic piston can move which is connected to the turning-up lever. The cylindrical portion is provided with a locking mechanism that can be engaged with or disengaged from the central shaft. When said locking mechanism is disengaged from the central shaft and a predetermined pressure is applied in the piston chamber, the clamping unit is integral with the turning-up lever and rotation of the threaded shaft involves axial movement of the whole half-drum. The two half-drums are moved close to each other to give the tyre a toroidal shape. When the locking mechanism is engaged on the central shaft and counter-pressure is applied in the piston chamber, rotation of the threaded shaft causes movement of the turning-up lever relative to the clamping unit and said turning-up lever moves upwards and towards the centre of the building drum to turn up the components of the tyre shaped around the bead core and against the sidewall.

DISCLOSURE OF THE INVENTION

The Applicant has perceived that accuracy in all movements imparted to the tyre components by the mechanisms of a second-stage drum (during location of the bead cores, shaping and turning-up, for example) have an important effect on the quality of the produced tyre.

More particularly, the Applicant has perceived the importance of positioning the components of the tyre being formed on the second-stage drum with perfect symmetry and of giving said components symmetric movements relative to the rotation axis of the tyre. In fact, this symmetry allows tyres to be obtained that are structurally uniform along their extension around the rotation axis, i.e. provided with an optimal radial symmetry, and consequently tyres of higher qualities and better performances in terms of duration, comfort and roadholding.

The Applicant has found that the second-stage drums of the type described in WO 2009/142482 do not allow such results to be achieved because the relative displacements of the moving parts are not perfectly symmetric and synchronised with each other.

In particular, with reference to the aforesaid document WO 2009/142432, the Applicant has noticed that during the combined movement of the clamping unit disposed on the cylindrical portion and the turning-up lever, these two elements would be maintained integral and irremovable relative to each other only by means of the pressure exerted in the pneumatic piston chamber connected to said turning-up lever. Since the axial movement of the lead screw nuts obtained by rotation of the threaded shaft is transferred to the respective clamping unit (retaining the bead cores) only by means of the pneumatic piston, the pressure value in the chamber may be submitted to fluctuations during shaping of the tyre and may not be, even only temporarily, sufficient to counteract the elastic reaction of said tyre being shaped. As a result, during shaping the axial displacements of the two clamping units and of the tyre components carried by them are not perfectly symmetric and simultaneous and can generate undesirable and dangerous asymmetry in the tyre itself.

In the light of the above, the Applicant therefore aims at providing a process and an apparatus for building tyres for vehicle wheels enabling the quality of the produced tyres to be improved and, in particular, tyres to be obtained that are structurally uniform along their extension around the rotation axis, i.e. provided with an optimal radial symmetry.

In particular, the Applicant aims at providing a process and an apparatus that, in the operations carried out on the second-stage drum among which location of the bead cores, shaping of the carcass sleeve and turning-up of the end flaps of such a carcass sleeve, can ensure synchronous and symmetric movements of the components of the tyre being processed.

The Applicant has finally found that through use of an exclusively mechanical locking and unlocking device, operatively interposed between the lead screw nut carrying the turning-up lever or arm and the respective half-drum adapted to bear and retain the bead cores and beads of the tyre being formed, the requirements set out above are satisfied.

More specifically, in a first aspect, the present invention relates to a process for building tyres for vehicle wheels, comprising:

arranging a carcass sleeve including at least one carcass ply on a shaping drum comprising two half-drums and two supports, each support being operatively associated with one of the half-drums and carrying a plurality of turning-up levers having free ends positioned close to the respective half-drum, wherein the carcass sleeve disposed on the half-drums covers at least said free ends;

arranging two annular anchoring structures around the carcass sleeve;

locking each of the two supports relative to the respective half-drum by interposing only stiff mechanical elements in mutual contact between said support and the respective half-drum;

setting a threaded shaft in rotation for giving a toroidal conformation to the carcass sleeve;

unlocking each of said two supports from the respective half-drum;

setting said threaded shaft in rotation for lifting the free ends of said turning-up levers until turning up the end flaps of the carcass sleeve around the annular anchoring structures.

In accordance with a second aspect, the present invention relates to an apparatus for building tyres for vehicle wheels, comprising:

a shaping drum provided with:

two half-drums;

two supports, each operatively associated with one of the half-drums and carrying a plurality of turning-up levers having free ends positioned close to the respective half drum;

a threaded shaft for axially moving the supports and the half-drums in mutually approached or mutually spaced relationship through its own rotation;

a mechanical locking and unlocking device interposed between each half-drum and the respective support and suitable to be configured either in an unlocked position, in which the support is movable relative to the half-drum, or in a locked position in which the support is fixed relative to the half-drum.

It is the Applicant's opinion that the mechanical constraint between each of the supports and the respective half-drum ensures the necessary stiffness to the assembly consisting of these two elements (support and half-drum) so that they can move like a single body while they exert the necessary thrust on the beads of the carcass sleeve during the toroidal shaping thereof. In this configuration, the system only has one degree of freedom, which means that upon rotation of the threaded shaft through a predetermined angle there is only one unequivocal axial displacement of the two aforesaid half-drums (by the same amount but in opposite ways) exerting pressure against the beads. Due to the absence of possible relative movements between the support and respective half-drum, perfectly synchronous and symmetric movements of the half-drums can be obtained and, consequently, symmetric deformation of the carcass sleeve over time (during shaping) relative to the mid-line plane of the tyre being formed will occur. This symmetric deformation leads, at the end of the approaching step of the half-drums, to accomplishment of a toroid provided with an excellent radial symmetry.

The present invention, in at least one of the above aspects, can further have one or more of the preferred features hereinafter described.

According to a preferred embodiment of the invention, locking of each of the two supports relative to the respective half-drum comprises: locking second ends of guide rods on the support, each guide rod having a first end integral with the half-drum.

Preferably, locking of the second ends of the guide rods on the support comprises: moving a flange mounted on the support to an engagement position, in which said second ends of the guide rods are locked in openings of said flange.

Preferably, unlocking of each of the two supports relative to the respective half-drum comprises: leaving said guide rods free to slide through the support.

Preferably, unlocking of each of the two supports relative to the respective half-drum comprises: moving a flange mounted on the support to a disengaged position, in which the second ends of the rods are free to pass through openings of said flange.

The above listed process steps are linear and of immediate accomplishment and the structure making said steps possible is strong, simple and cheap.

According to a preferred embodiment, before setting said threaded shaft in rotation for moving each support close to the respective half-drum, the half-drums are hooked to a spacer put between the half-drums and mounted on a shaft carrying said half-drums.

During turning-up of the end flaps of the carcass sleeve, the half-drums bears against the spacer constituting a strong constraint capable of preventing any movement of the half-drums themselves towards/coming out of the mid-line plane.

Preferably, the process comprises: replacing the spacer with another different spacer for building a different tyre.

The process according to the invention enables different types of tyres to be built since the half-drums can be positioned and locked to any mutual distance by merely selecting a spacer having a suitable geometry/size.

According to a preferred embodiment, the process comprises positioning of each of said annular anchoring structures at an annular retaining seat of a respective half-drum.

The annular seats prevent any movement of the annular structures relative to the half-drums during the process, and therefore help in ensuring the symmetry of the carcass sleeve deformation over time during shaping and turning-up and in keeping the position and shape during other steps, such as rolling of the tread band and the sidewalls.

Preferably, said positioning of each of the annular anchoring structures comprises: radially expanding a plurality of axially internal sectors and a plurality of axially external sectors of each half-drum so as to delimit the annular retaining seat, until receiving the respective annular anchoring structure in said annular retaining seat.

During radial expansion of said sectors, all points in the circumferential surface of each of said annular structures come into contact simultaneously with the respective annular seat, so as to maintain the annular structures coaxial with each other and centred relative to the rotation axis of the tyre.

According to a preferred embodiment, during radial expansion of the axially external sectors the free ends of the turning-up levers rest on tailpieces of said axially external sectors and follow the radial expansion movement thereof.

Already during this step, the turning-up levers start tilting, radially moving said free ends away from the half-drums, so as to facilitate the subsequent movement of the levers themselves and turning up of the end flaps of the carcass sleeve.

According to a preferred embodiment, in a starting action of moving each support close to the respective half-drum, the free ends of the turning-up levers slide on an inclined surface carried by the axially external sectors.

The inclined surface prevents the levers from jamming and makes the initial turning-up movement more fluid.

In accordance with a preferred embodiment, the process comprises;
  providing a carcass sleeve on a fist-stage drum;
  providing a crown structure;
  arranging the crown structure around the carcass sleeve disposed on the shaping drum;
wherein, during the toroidal conformation, a radially external portion of the carcass sleeve is brought against the crown structure.

This type of dual-stage process is preferably used for building tyres for trucks.

Preferably, said threaded shaft carries two lead screw nuts each of which is rigidly connected to one of the supports for mutually approaching the two half-drums along an axial direction during said toroidal conformation of the carcass sleeve.

Preferably, said rotation of said threaded shaft for lifting the free ends of said turning-up levers moves each support close to the respective half-drum along an axial direction.

Connection of the only threaded shaft with the supports through the lead screw nuts ensures synchronism of movements and allows only one motor to be used that causes rotation of the threaded shaft for carrying out both shaping of the sleeve and turning-up of the end flaps.

According to a preferred embodiment, the mechanical locking and unlocking device comprises a plurality of guide rods each having a first end integral with the half drum and a second end slidably coupled to the support.

Preferably, the mechanical locking and unlocking device comprises a retaining unit operatively acting between the second ends of the guide rods and the support and movable between an engaged position and a disengaged position; in which in the locking configuration the retaining unit is in the engaged position and the second ends of the rods are locked on the support.

The rods make the support and half-drum integral, when the locking and unlocking device is in the locked position.

Although provided with a simple and light structure and also of reduced bulkiness, the rods in the locked position ensure immobility of the support relative to the half-drum.

Preferably, the retaining unit comprises:
  a flange mounted on the support and having openings for the rods, wherein each opening has a first portion and a second portion;
  actuators for moving the flange between the engaged position, in which the rods are locked in the first portions, and the disengaged position, in which the rods slide through the second portions.

A mere displacement of the flange (moving in translation or rotation) enables the half drum and the support to be linked and this displacement can be carried out with any (electric, hydraulic, pneumatic) type of motor. The retaining unit thus structured is in addition strong and reliable.

Preferably, the flange is movable in rotation on the support between the engaged position and the disengaged position.

According to a preferred embodiment, the shaping drum comprises:
  a shaft carrying the half-drums and the supports in a slidable manner;
  a spacer mounted on the shaft and interposed between the half-drums;
wherein, each of the half-drums can be hooked to the spacer for locking it onto the shaft.

Preferably, the threaded shaft is coaxially housed in the shaft and the assembly consisting of the shaft, the threaded shaft and the spacer constitutes a strong frame for support and constraint of the half-drums and the support.

Preferably, the spacer is interchangeable.

Preferably, each half-drum has an annular retaining seat for housing a respective bead of the tyre being processed.

In a preferred embodiment, each half-drum comprises a plurality of axially internal sectors and a plurality of axially external sectors radially movable for delimiting the respective annular retaining seat.

Preferably, the axially internal sectors are radially movable in an independent manner from the axially external sectors to enable locking optimisation of the annular anchoring structures from the transport devices thereof to the half-drums.

In a preferred embodiment, at least one of the guide rods has an inner channel in fluid communication with the respective axially internal sectors and/or the respective axially external sectors for passage of a working fluid adapted to control the radial movement of said sectors.

Therefore further channels or outer pipes that would constitute a hindrance and would run the risk of being damaged by the movements of the apparatus elements and the tyre components are not required.

Preferably, the axially external sectors comprise rest tailpieces for the free ends of the turning-up levers.

Preferably, the axially external sectors comprise inclined surfaces for sliding of the free ends of the turning-up levers.

In accordance with a preferred embodiment, the shaping drum is a second-stage drum and wherein the apparatus comprises:
  a first-stage drum for building of the carcass sleeve;
  a transport device operatively acting between the first-stage drum and the second-stage drum for carrying the carcass sleeve from the first-stage drum to the second-stage drum.

Preferably, said threaded shaft is coupled to two lead screw nuts each of which is rigidly connected to one of the supports.

Further features and advantages will become more apparent from the detailed description of a preferred but not exclusive embodiment of a process and an apparatus for building tyres for vehicle wheels, in accordance with the present invention.

BRIEF DESCRIPTION OF DRAWINGS

This description will be set out hereinafter with reference to the accompanying drawings, given by way of non-limiting example, in which;

FIG. 1 shows a half-portion sectioned in an axial plane of a shaping drum belonging to an apparatus according to the present invention;

FIGS. 2a and 2b show a front view of an element of the shaping drum of FIG. 1 in respective operating configurations;

DETAILED DESCRIPTION OF PREFERRED EMBODIMENTS OF THE INVENTION

Figure 3:
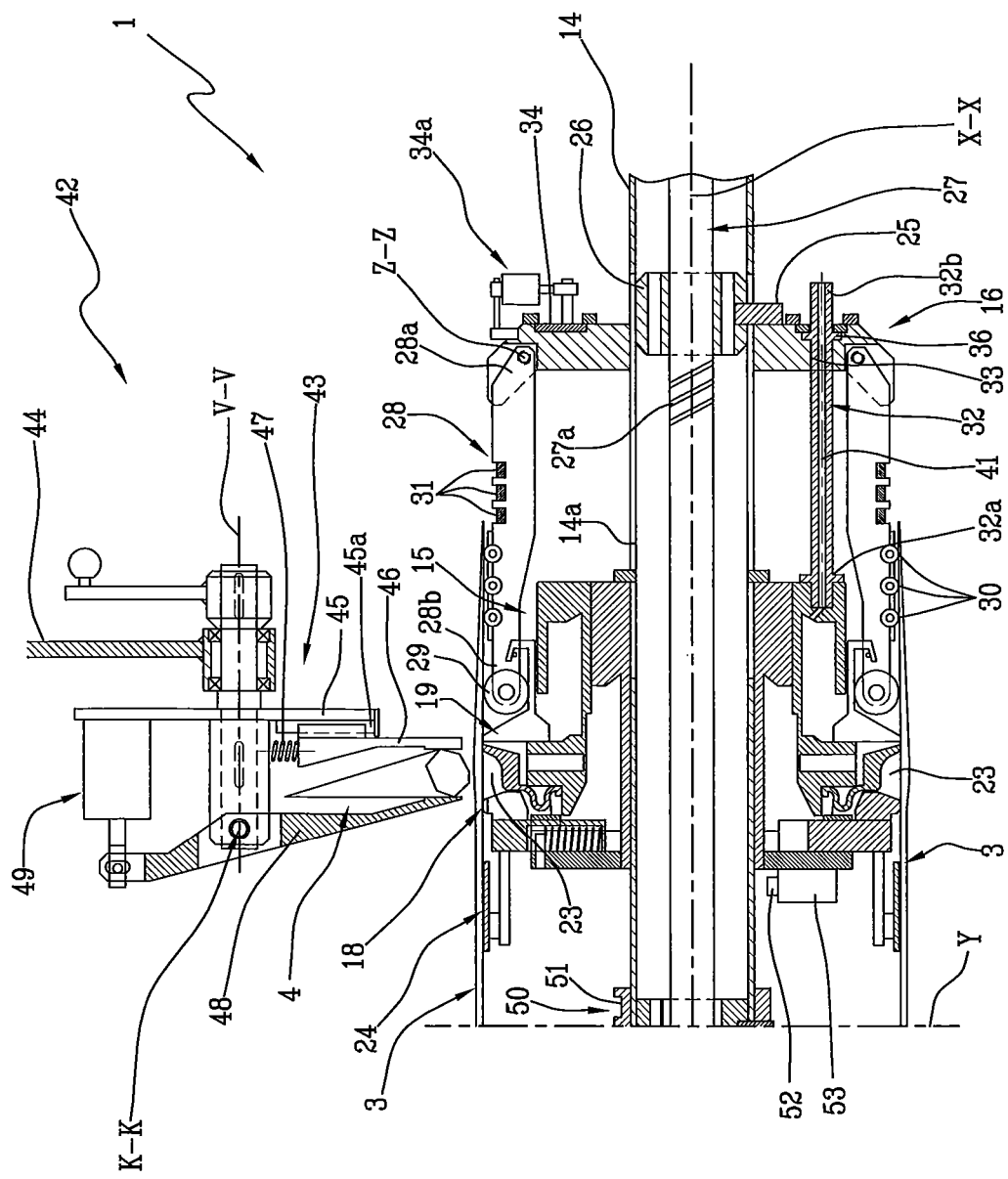
FIGS. 3-10 show the half-portion of FIG. 1 in a succession of operating positions correlated with the process being the object of the present invention.

With reference to the drawings, a shaping drum being part of an apparatus for building tyres for vehicle wheels has been generally identified by reference numeral 1.

Figure 10:
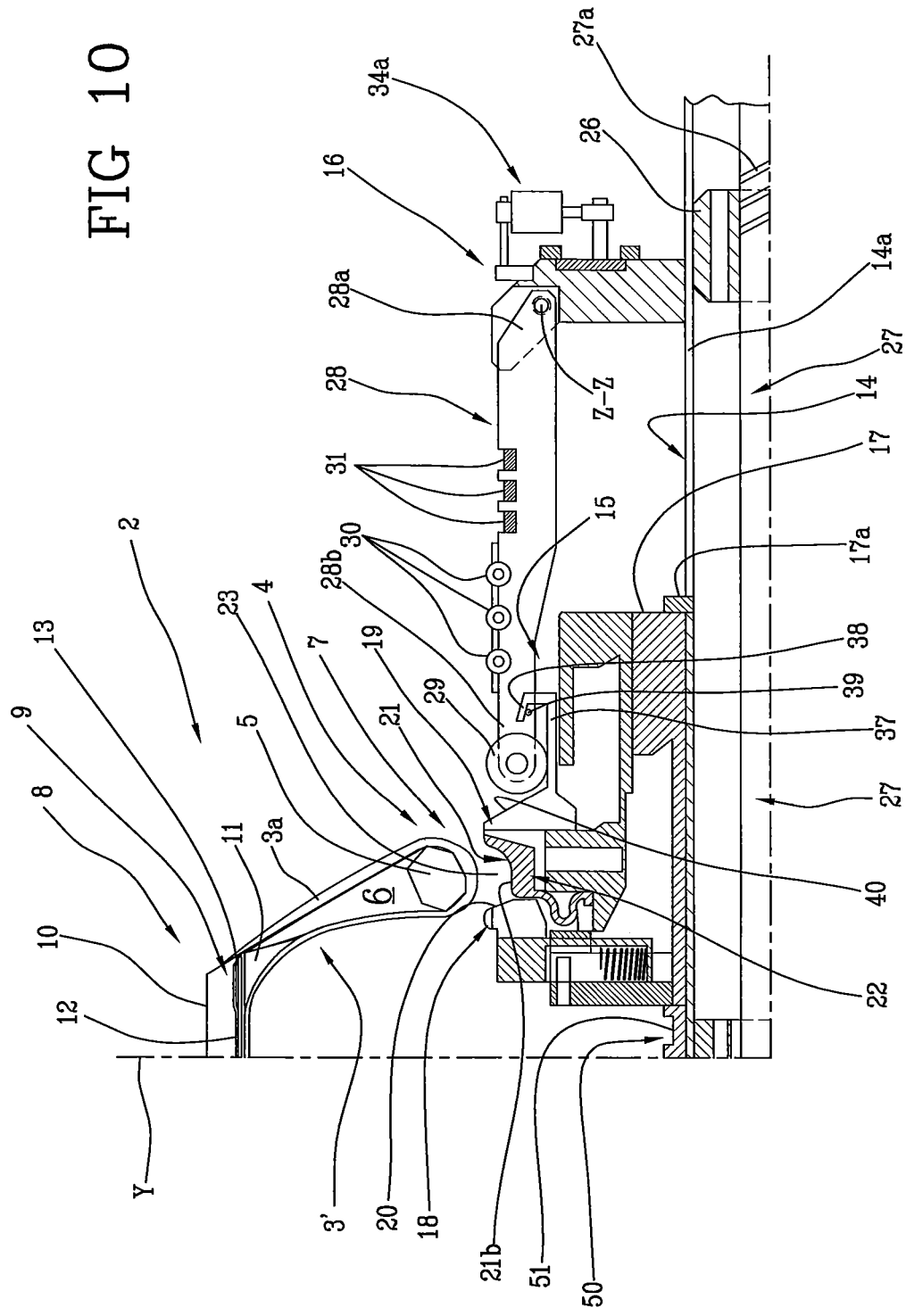

A diagrammatic non-limiting example of a tyre 2 built using the apparatus of the present invention is shown in FIG. 10. Tyre 2 as shown is preferably of the type intended for use on heavy duty vehicles. By "heavy duty vehicle" it is generally intended a vehicle belonging to the categories M2~M3, N1~N3 and O2~O4 defined in "Consolidated resolution of one Construction of Vehicles (R.E.3) (1997)", Annex 7, pages 52-59, "Classification and definition of power-driven vehicles and trailers" such as lorries, trucks, tractors, buses, vans and other vehicles of this type.

Tyre 2 comprises a carcass structure 3' including at least one carcass ply. A layer of airtight elastomeric material or a so-called liner can be applied internally of the carcass ply/plies. Two annular anchoring structures 4, each comprising a so-called bead core 5 carrying an elastomeric filler 6 at a radially external position, are in engagement with respective end flaps of the carcass ply/plies. The annular anchoring structures 4 are integrated in the vicinity of regions usually identified as "beads" 7, at which usually engagement between tyre 2 and a respective mounting rim occurs. A crown structure 3 is circumferentially applied around the carcass ply/plies. The crown structure 8 comprises a belt structure 9 having one or more belt layers and a tread band 10 circumferentially superposed on the belt structure 9. Sidewalls 3a extend from the corresponding bead 7 to a corresponding side edge of the tread band 10. An insert 11 is disposed substantially close to the shoulder portion, i.e. the portion where the side end of the tread band 10 is connected to the sidewall. In particular, insert 11 has a portion substantially interposed in the radial direction between the carcass structure 3' and belt structure 3 and a portion substantially interposed in the axial direction between the carcass structure 3' and the sidewall 3a.

The belt structure 9 of a tyre for heavy vehicles typically comprises a belt layer 12 usually known as "gravel-guard belt" which is the radially outermost layer of the belt structure and acts as the protection layer against penetration of stones and/or fine gravel towards the innermost layers of the tyre structure. The belt structure 9 of a tyre for heavy vehicles may further comprise a reinforcing side strip 13 that can be radially superposed on the second belt layer, at an axial end thereof. The side strip incorporates a plurality of reinforcing elements, preferably high-elongation metal cords.

The above described tyre 2 is preferably manufactured by first providing on a first-stage drum, not shown, a carcass sleeve 3 of tubular shape and comprising the carcass ply/plies, the liner, the sidewalls 3a and possible other elements, and by subsequently fitting the annular anchoring structures 4, wherein said carcass ply/plies have not yet been turned up around said annular anchoring structures 4. The carcass sleeve 3 is then transferred onto said shaping drum 1, which therefore is also identified as second-stage drum.

In accordance with undescribed variants of the process, tyre 2 of the disclosed type or also of other type (for motorcycles or motor-vehicles, for example) is uniquely built on a forming drum comprising the hereinafter illustrated features of the shaping drum 1.

The shaping drum 1 comprises a hollow shaft 14 on which two assemblies are such mounted that they can slide on the shaft 14 itself and each of them comprising a half-drum 15 and a support 16. The shaping drum 1 has a mid-line plane "Y" corresponding to the equatorial plane of tyre 2 being formed, and the two assemblies are structurally symmetric and move in synchronous and symmetric manner relative to said mid-line plane "Y". The present detailed description therefore will refer to one alone of the two assemblies.

The half-drum 15 comprises a tubular body 17 slidably fitted on shaft 14 but integral with shaft 14 in its rotary motion due, for example, to a key 17a passing through a slot 14a formed in shaft 14. The tubular body 17 at a radially external position carries a plurality of axially internal sectors 18, i.e. closer to the mid-line plane "Y", and a plurality of axially external sectors 19, i.e. farther from the mid-line plane "Y".

The axially internal sectors 18 are consecutively disposed so as to form a ring around shaft 14 and are movable between a radially contracted position and a radially expanded position by means of hydraulic or pneumatic operation. At least in the radially expanded position, the mutually adjacent axially inner sectors 18 confine a preferably inclined first rest surface 20, facing away from the mid-line plane "Y".

The axially external sectors 19 too are consecutively disposed so as to form a ring around shaft 14 and are movable between a radially contracted position and a radially expanded position by means of hydraulic or pneumatic operation. At least in the radially expanded position, the mutually adjacent axially external sectors 19 confine a second rest surface 21 that in the embodiment shown has a preferably inclined first portion 21a facing the mid-line plane "Y", i.e. turned towards the first rest surface 20, and a second portion 21b that is substantially cylindrical and parallel to shaft 14.

As shown, the second rest surface 21 comprises a spring ring 22 mounted on the axially external sectors 19.

The axially internal sectors 18 are moved in an independent manner from the axially external sectors 19 and, to this aim, the tubular body 17 has channels and/or chambers (not shown in detail) in fluid connection with an outer source for liquid or gas under pressure.

The first and second rest surfaces 20, 21 delimit an annular retaining seat 23 the shape of which in radial section changes, as explained in the following, depending on the relative position of the axially internal sectors 18 and the axially external sectors 19.

Some of the axially internal sectors 18 further carry supporting plates 24 in cantilevered fashion which extend towards the mid-line plane "Y". Each of the supporting plates 24 has a respective radially external surface and all these surfaces together define a circumferential surface coaxial with shaft 14.

Support 16 is slidably fitted on shaft 14 and is connected, preferably by means of a key 25 passing through slot 14a formed in shaft 14, to a lead screw nut 26 mounted inside the shaft 14 itself.

A threaded or at least partly threaded shaft 27 is installed in shaft 14, coaxial therewith, and has opposite end portions 27a threaded in opposite ways. An internal thread of each lead screw nut 26 is in engagement with a respective thread 27a of the threaded shaft 27, in such a manner that rotation of the threaded shaft 27 (by an electric motor, for example) causes translation of the lead screw nuts 26 and supports 16 making them move close to or away from each other.

Support 16 carries a plurality of turning-up levers 28 (thirty-six, for example). Each turning-up lever 28 has one end 28a connected to support 16 around a rotation axis "Z-Z" whose direction is perpendicular to a common longitudinal axis "X-X" of the shaft 14 and the threaded shaft 27. Lever 28 extends towards the mid-line plane "Y" and one free end 28b of said lever 28 carries an idler roller 29 susceptible of engagement against the half-drum 15 or tyre 2 being formed. The turning-up lever 28 further comprises a plurality of small idler rollers 30 disposed on a radially external portion thereof. Spring rings 31 (only visible in section in the accompanying drawings) are further wrapped around all levers 28 of each support 16.

The half-drum 15 is connected to support 16 by a plurality of guide rods 32 (four in number in the example shown). Each guide rod 32 extends parallel to the longitudinal axis "X-X" of shaft 14, has a first end 32a integrally secured to the half-drum 15 and extends away from said half-drum 15 and the mid-line plane "Y". Each guide rod 32 in addition passes through through holes 33 formed in the support 16 and a second end 32b of each rod 32 faces one side of support 16 opposite to that facing the half-drum 15.

Support 16 on its side opposite to the one facing the half-drum 15 carries an annular flange 34 coaxial with the longitudinal axis "X-X". The annular flange 34 has as many openings 35 as the guide rods 32 (FIGS. 2a and 2b). Each opening 35 is placed at one of the through holes 33 of support 16. Each opening 35, as shown in FIGS. 2a and 2b, comprises a first elongated portion 35a and a second circular portion 35b. The second circular portion 35b has greater sizes than the respective through hole 33. Each guide rod 32 at its second end 32b has an annular ridge 36 such sized that it can pass through the second circular portion 35b of flange 34 but cannot pass through the first elongated portion 35a and the through hole 33. The annular ridge 36 therefore prevents the guide rod 32 from coming out of support 16 and the support 16 from being separated from the half-drum 15.

Flange 34 is movable in rotation around the longitudinal axis "X-X" and can be rotated, by means of actuators 34a, between an engaged position in which the first elongated portions 35a of openings 35 face the through holes 33 and the annular ridges 36 are clamped between flange 34 and support 16 (FIG. 2a), and a disengaged position in which the second circular portions 35b of openings 35 face the through holes 33 and the annular ridges 36 can pass through the flange 34 (FIG. 2b).

The actuators 34a shown are hydraulic or pneumatic cylinders having one end, that of the cylinder body, preferably secured to support 16 and the opposite end, that of the rod, preferably secured to the flange 34.

When the flange 34 is in the engaged position (FIG. 2a), the support 16 is integral with the half-drum 15 and is in the position of maximum distance from said half-drum 15 (as in FIG. 1).

Interposed between the support 16 and the respective half-drum 15 are only stiff mechanical elements in mutual contact, i.e. rods 32 and flange 34, making the support 16 and half-drum 15 a single stiff body. Flange 34 is part of a retaining unit capable of fastening the free ends 32b of rods 32 to support 16.

In the maximum-distance position between the half-drum 15 and support 16, the free end 28b of each lever 28 lies close to one of the axially external sectors 19. In greater detail, the axially external sectors 19 that are placed close to the turning-up levers 26 carry rest tailpieces 37 extending away from the mid-line plane "Y". Each rest tailpiece 37 in addition terminates with a hook 38 intended for engagement with a peg 39 fastened to the turning-up lever 28. The idler roller 29 of each turning-up lever 28 bears on the respective rest tailpiece 37 and lies in a position facing an inclined surface 40 extending radially away from the rest tailpiece 37 and towards the mid-line plane "Y". The inclined surfaces 40 are part of the axially external sectors 19.

Figure 8:
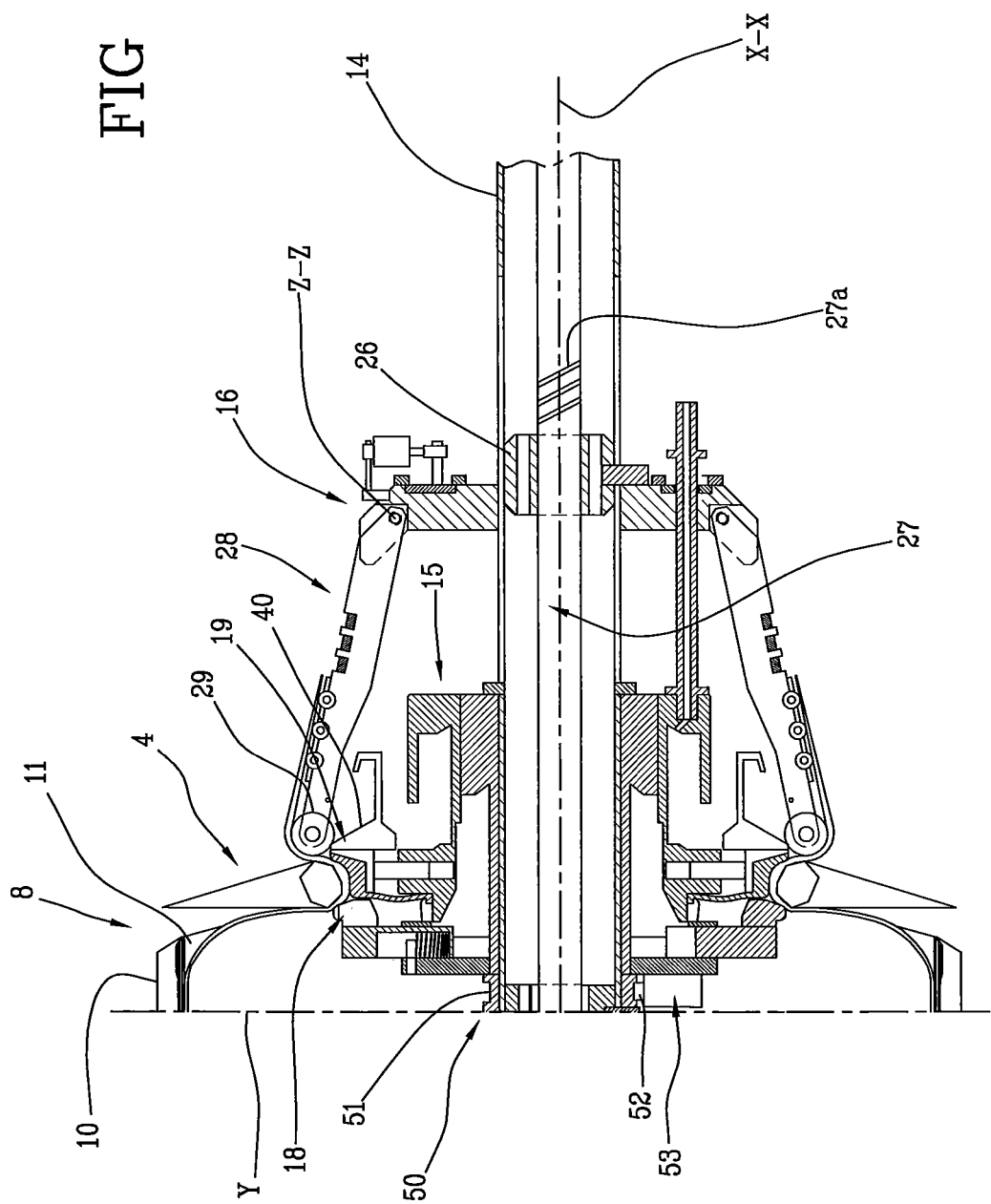
Figure 9:
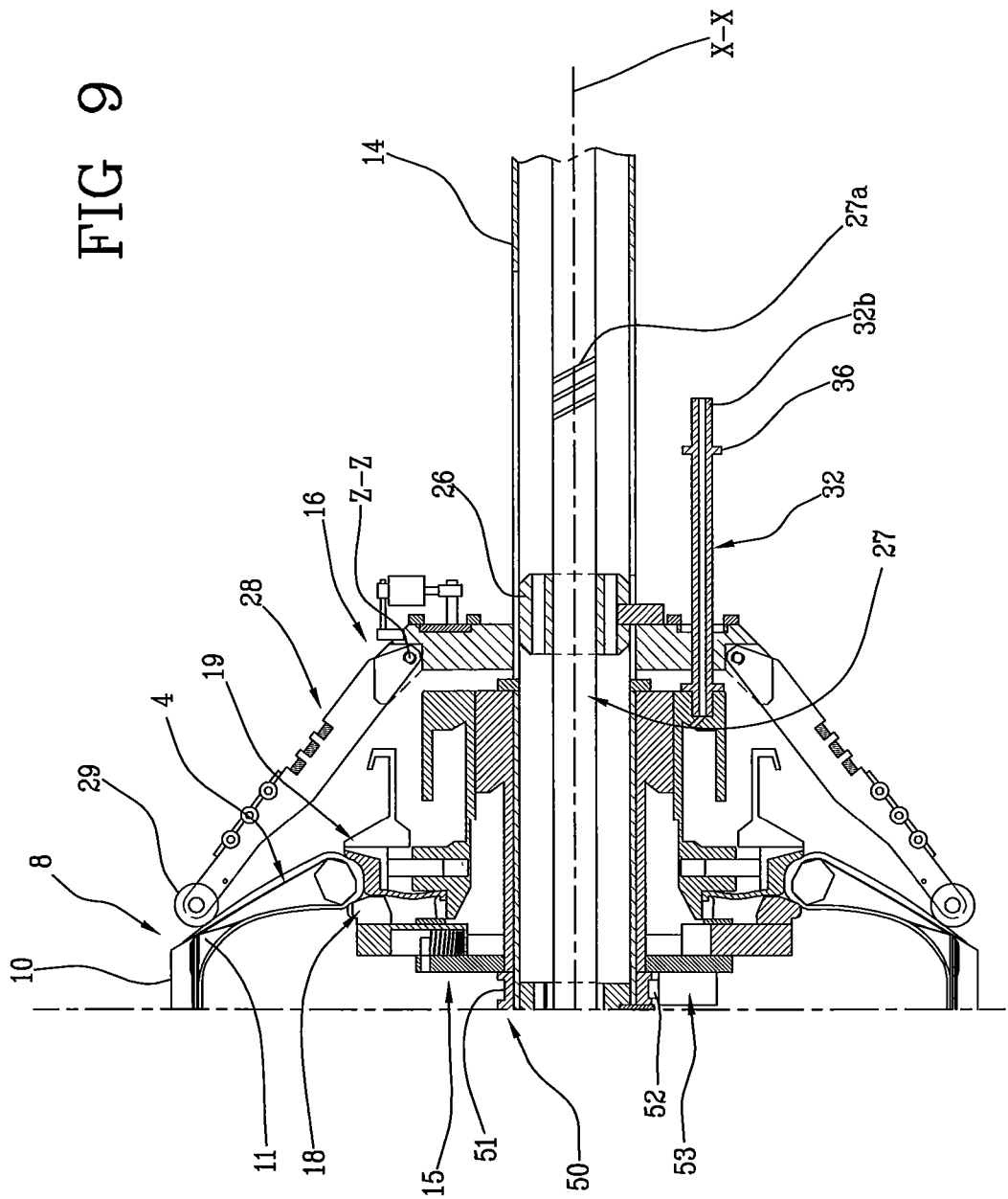

When the flange 34 is in the disengaged position (FIG. 2b), the support 16 is free to slide on the guide rods 32 and move close to the half-drum 15 (as shown in FIGS. 8 and 9).

The rods 32 and flange 34 therefore define a mechanical locking and unlocking device that can be configured either in an unlocked position in which support 16 is movable relative to the half-drum 15, or in a locked position in which support 16 is fixed relative to the half-drum 15.

Each of the guide rods 32 has a channel 41 inside it which is in fluid communication with the channels and/or chambers of the tubular body 17 to carry the liquid or gas of an outer source and cause movement of the axially internal sectors 18 and/or axially external sectors 19 and/or the actuators 53 described in the following.

Figure 4:
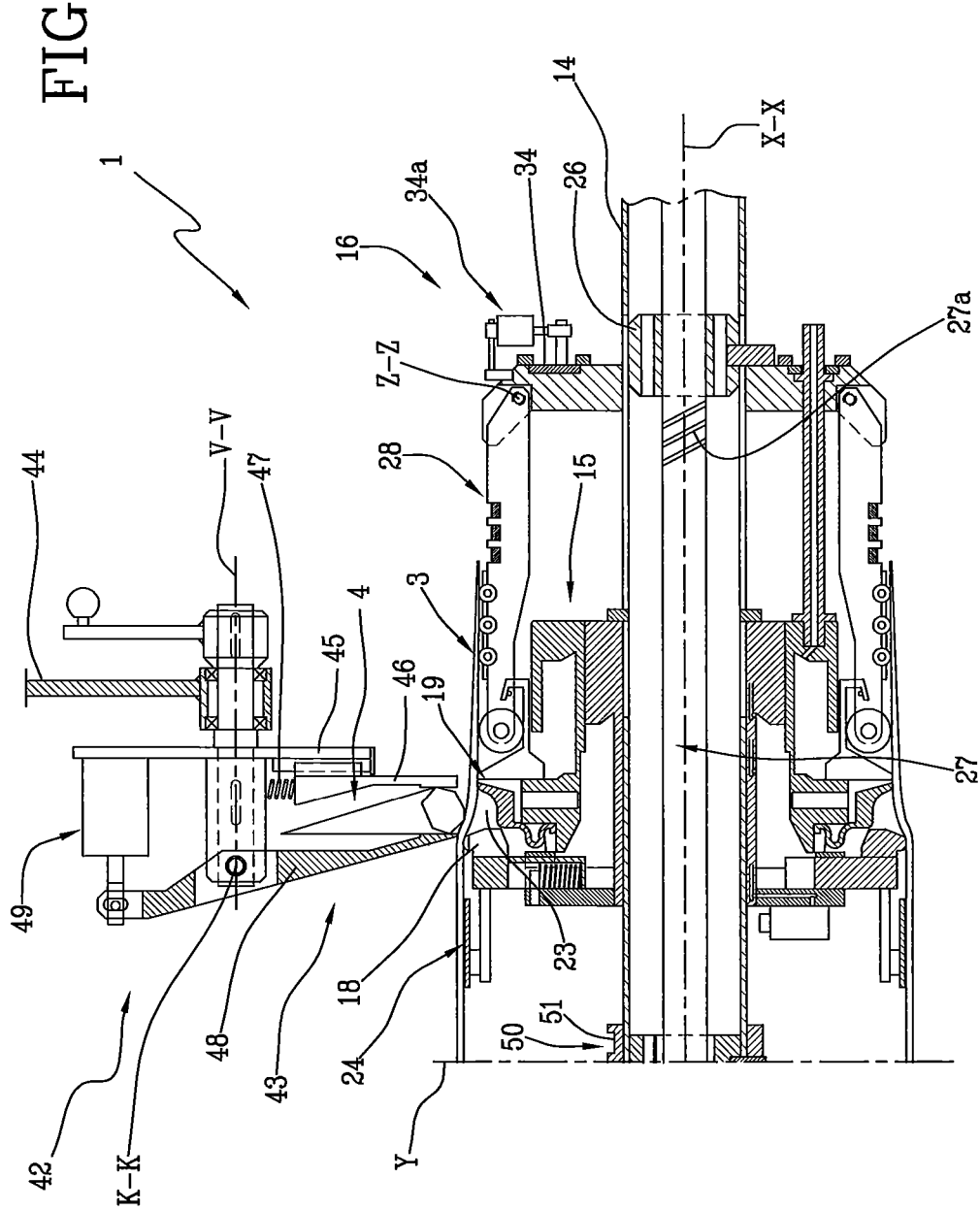
Figure 5:
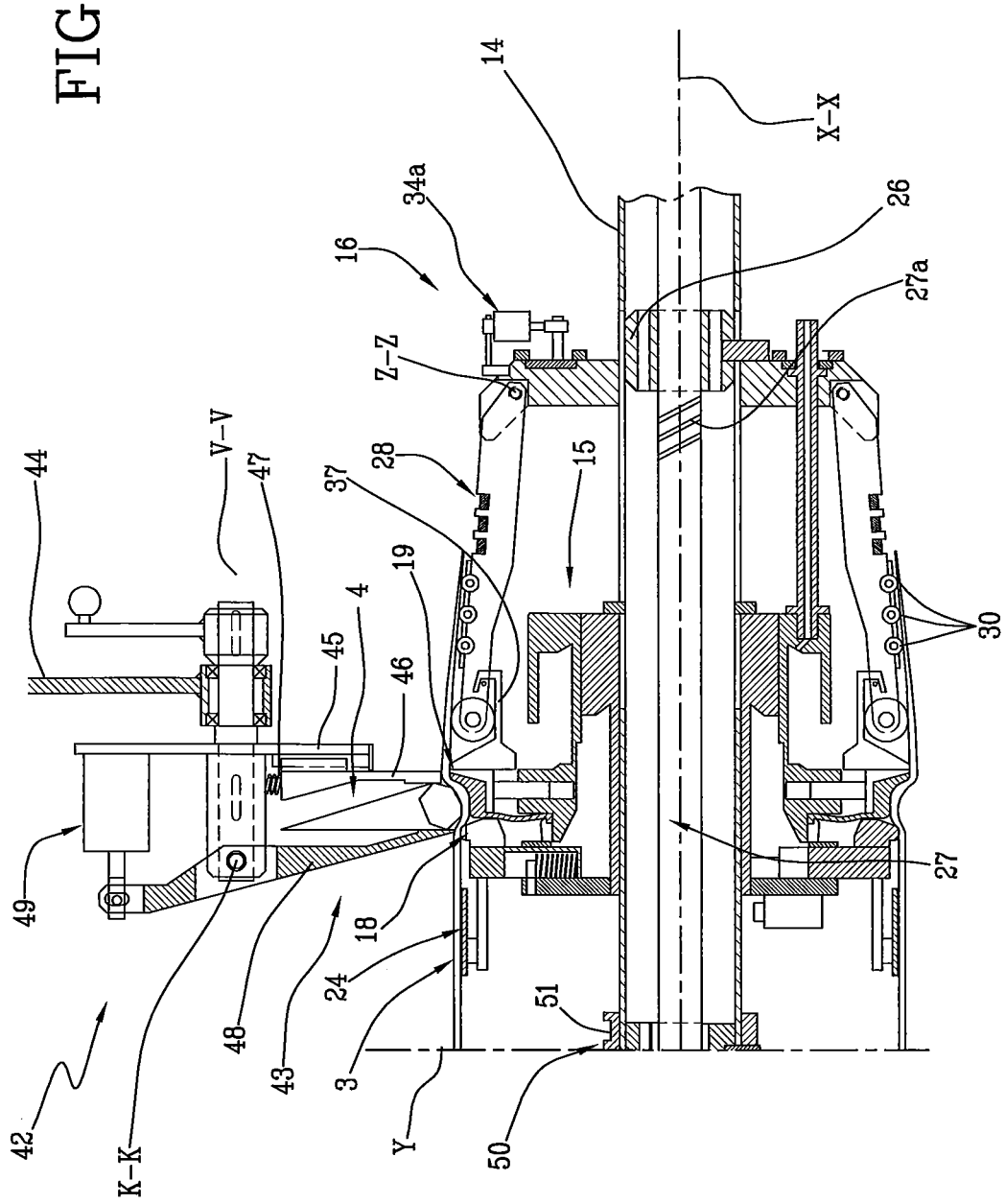

The apparatus according to the invention further comprises a transport device 42 operatively acting between said first-stage drum and the shaping drum 1 for carrying the carcass sleeve 3 from the first-stage drum to the shaping drum 1. The transport device 42 comprises two sets of clamps 43 (FIGS. 3-5). The clamps 43 of each set (four in number, for example) are mounted on a transport structure 44, only partly shown, and are disposed on a circular path so that all together they can retain an annular anchoring structure 4. Each of the two mentioned sets of clamps 43 can therefore carry a respective annular anchoring structure 4 and is able to arrange it coaxially around the shaping drum 1.

Each clamp 43 comprises a frame 45 linked to the transport structure 44 around a first articulation axis "V-V" parallel to the longitudinal axis "X-X" (at least when clamps 43 are disposed around the shaping drum 1). Mounted on frame 45 is a first blade 46 that can translate on a guide 45a of frame 45 and is maintained in a maximum extracted position by a spring 47. A second blade 48 has one end facing the first blade 45, an opposite end connected to an actuator 49 (a pneumatic cylinder, for example) and an intermediate portion pivotally mounted on frame 45 around a second articulation axis "K-K" perpendicular to the first articulation axis "V-V". Actuator 49 enables the second blade 48 to be moved around the second articulation axis "K-K" to close or open the clamp 43. Actuating devices, not shown, allow all clamps 43 of a set to be rotated around their respective first articulation axes "V-V" to move them between a first position at which the ends of blades 45, 48 are radially turned towards the shaping drum 1, and a second position at which the ends of blades 45, 48 are spaced from the shaping drum 1.

Mounted on shaft 14 in a removable and interchangeable manner is a spacer 50 disposed at the mid-line plane "Y" of the shaping drum 1. Spacer 50 is provided with housings 51 formed in a radially peripheral portion thereof and preferably has annular shape. In housings 51 engagement ends 52 of the actuators 53 (that in the example shown are pneumatic cylinders) can be received, said actuators being integrally mounted on the half-drums 15 to lock said half-drums 15 on shaft 14.

In use, in accordance with the process of the invention, the transport device 42 by means of clamps 43 receives two annular anchoring structures 4 from a suitable magazine, fits said annular anchoring structures 4 on the first-stage drum carrying the just formed carcass sleeve 3 and picks up the carcass sleeve 3 from the first-stage drum, by means of a plurality of suction cups not shown, for example.

The transport device 42 brings the carcass sleeve 3 and the annular anchoring structures 4 that surround it and can be radially spaced therefrom, to the shaping drum 1 and fits said carcass sleeve 3 and the annular anchoring structures 4 on the shaping drum 1 (FIG. 3).

The clamps 43 and the annular anchoring structures 4 are placed in correspondence with the annular retaining seats 21. Opposite end flaps of the carcass sleeve 3 lie on the small idler rollers 30 and the idler rollers 29.

During this step, the annular flanges 34 are in the engaged position and the half-drums 15 are integral and spaced from supports 16.

At this point, the axially internal sectors 18 are radially expanded (FIG. 4) until they bring the carcass sleeve 3 in the vicinity of the radially internal ends of the second blades 48 and bring the supporting plates 24 against a radially internal surface of the carcass sleeve 3.

The clamps 43 reduce the grip force on the bead core 5 (discharging actuator 49) and the axially external sectors 19 are expanded (FIG. 5) until bringing the carcass sleeve 3 against the radially internal ends of the first blades 46 and pushing them radially away against the action of the force exerted by springs 47, so as to delimit the annular retaining seats 23 and partly wrap portions of the carcass sleeve 3 around the bead core 5. Simultaneously, radial expansion of the axially external sectors 19 causes, through the rest tailpieces 37, radial moving away of the free ends 28b of the turning-up levers 28 that start rotating through few degrees around the respective rotation axes "Z-Z".

Figure 6:
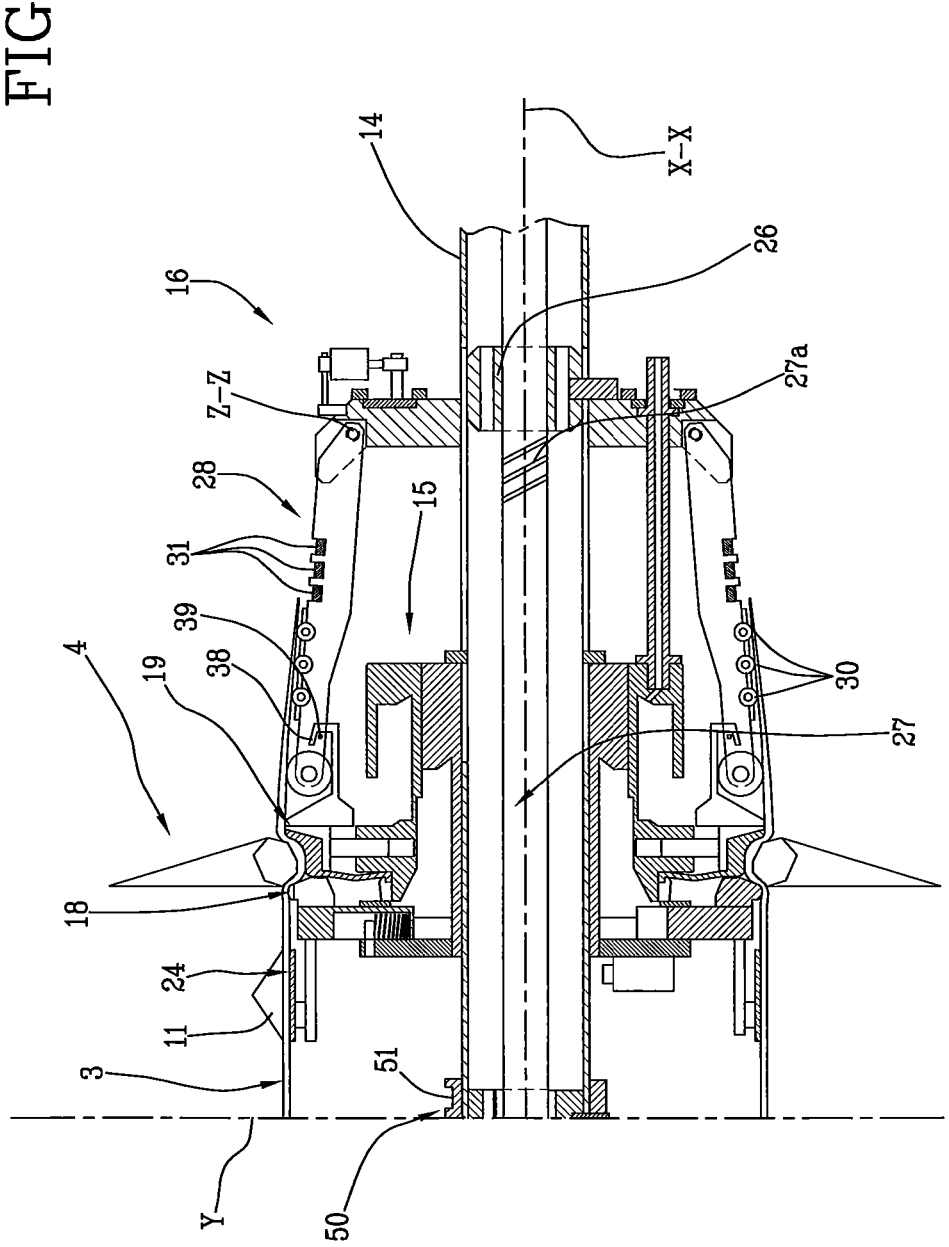

The clamps 43 release the bead cores 5 and are moved away from the shaping drum 1 and the axially internal sectors 18 are further expanded in the radial direction so as to axially lock the bead cores 5 in the annular retaining seats 23 (FIG. 6).

At this point, tensioning of the carcass sleeve 3 is carried out by moving the half-drums 15 and the supports 16 integral therewith just a little away from each other through rotation of the threaded shaft 27.

Then the inserts 11 are laid down on the radially external surface of the carcass sleeve 3 placed in correspondence with the supporting plates 24 through supply of an elongated element and rotation of the whole shaping drum 1 around the longitudinal axis "X-X". In this step, the hooks 38 provide centripetal force acting on pegs 39 that together with the spring rings 31 prevent the turning-up levers 28 from opening umbrella-like by effect of the centrifugal force.

Figure 7:
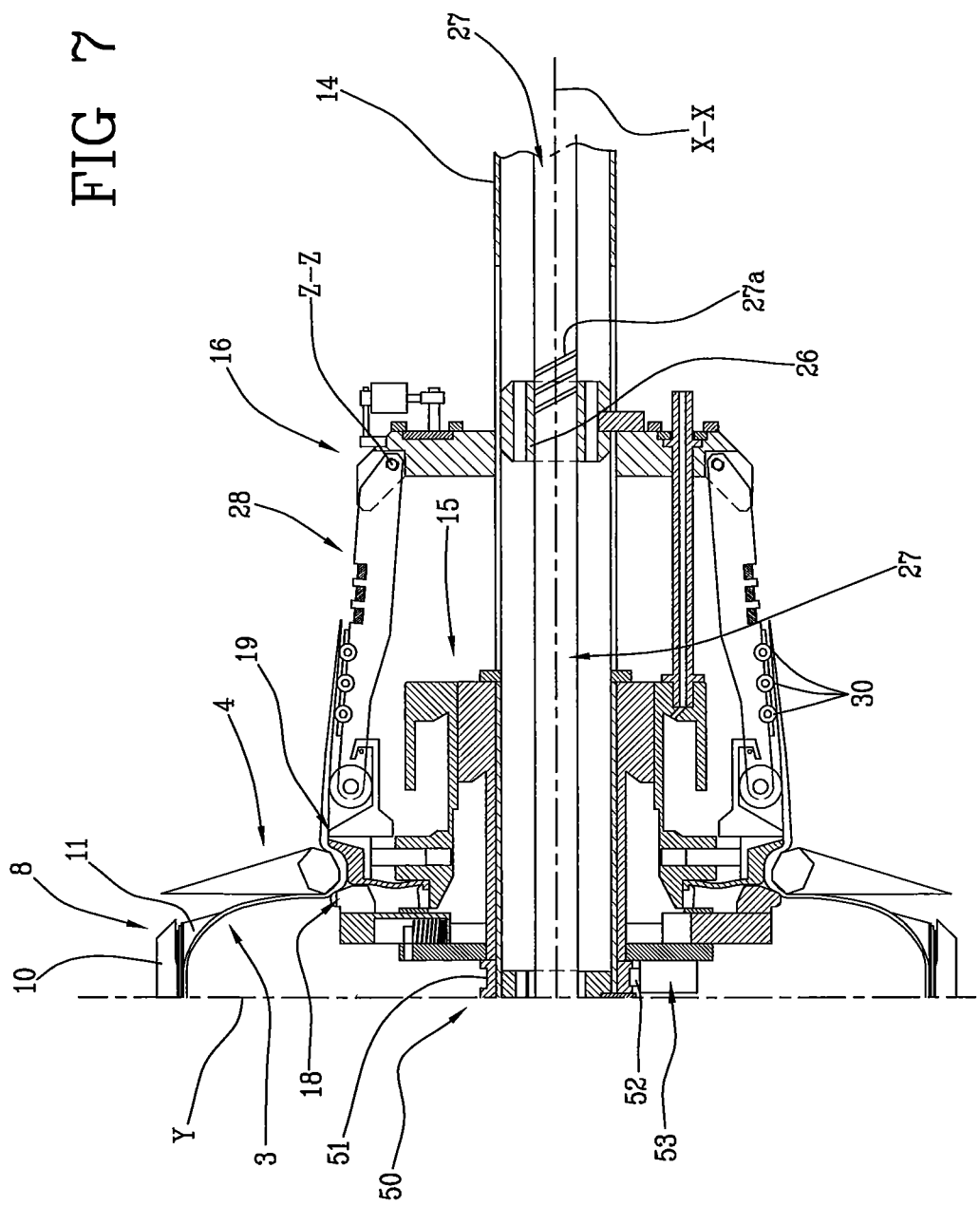

A further transport device, not shown, carries the crown structure 8 around the carcass sleeve 3, and the threaded shaft 27 is driven in rotation so as to mutually approach the half-drums 15 and supports 16 until giving the carcass sleeve 3 toroidal conformation through introduction of fluid under pressure into the half-drums 15 and taking a radially external portion of said carcass sleeve 3 against the crown structure 8 (FIG. 7).

At this point, the half-drums 15 are axially locked on shaft 14 by means of spacer 50 and actuators 53, and the annular flanges 34 are brought to the disengaged position unlocking supports 16 from the half-drams 15.

The threaded shaft 27 is driven in rotation so as to move supports 16 close to each other and towards the mid-line plane "Y" and make each of the supports 16 approach the respective half-drum 15. The idler roller 29 of each turning-up lever 28 rolls first on the respective inclined surface 40, then bears against the bead core 5, with interposition of the end flap of the carcass sleeve 3 and is stopped in this position (FIG. 8) for carrying out rolling of the tread band 10. A roller not shown is pressed against the tread band 10 while the shaping drum 1 is being rotated around the longitudinal axis "X-X".

After rolling, supports 16 are further moved close to the mid-line plane "Y" and each roller 23 rolls on the end flap pressing said end flap against filler 6 and until the end of this end flap is applied against an axially external end of the thread band 10 (FIG. 9).

Subsequently, supports 16 are brought back to the position of maximum distance from the half-drums 15 to carry out rolling of the side walls 3a and finally the axially internal sectors 18 and axially external sectors 19 are radially contracted to free beads 7 and enable release of tyre 2 from the shaping drum 1 (FIG. 10).

The invention claimed is:

1. A process for building a tyre for vehicle wheels, comprising:
   arranging a carcass sleeve comprising a carcass ply on a shaping drum comprising first and second half drums, first and second supports, and first and second sets of guide rods, the first support being operatively associated with the first half-drum, the second support being operatively associated with the second half-drum, the first set of guide rods having first ends integral with the first half-drum, the second set of guide rods having first ends integral with the second half-drum, and each support carrying a plurality of turning-up levers having free ends positioned close to its respective half-drum, wherein the carcass sleeve disposed on the first and second half-drums covers at least said free ends;
   arranging two annular anchoring structures around the carcass sleeve;
   locking each of the first and second supports relative to its associated half-drum by moving a flange mounted on the respective support to an engagement position in which second ends of the set of guide rods integral with the associated half-drum are locked in openings of said flange, wherein the first and second sets of guide rods are interposed respectively between said first and second supports and their associated half-drums;
   setting a threaded shaft in rotation for giving a toroidal conformation to the carcass sleeve while forces urging each half-drum towards its associated support are borne entirely by the locked guide rods;
   unlocking each support from its associated half-drum; and
   setting said threaded shaft in rotation for lifting the free ends of said turning-up levers until turning up end flaps of the carcass sleeve around the annular anchoring structures.

2. The process as claimed in claim 1, wherein the unlocking of each support relative to its associated half-drum comprises:
   leaving said guide rods free to slide through their associated support.

3. The process as claimed in claim 2, wherein the unlocking of each support relative to its associated half-drum comprises:

moving the flange mounted on each support to a disengaged position, in which the second ends of the rods are free to pass through openings of said flange.

4. The process as claimed in claim 1, wherein before the step of setting said threaded shaft in rotation for lifting the free ends of said turning-up levers, each half-drum is hooked to a spacer separating the first half-drum from the second half-drum of the shaping drum, wherein the spacer is mounted on a shaft carrying said half-drums.

5. The process as claimed in claim 4, comprising:
replacing the spacer with another different spacer for building a different tyre.

6. The process as claimed in claim 1, comprising positioning of each of said annular anchoring structures in correspondence with an annular retaining seat of a respective one of the half-drums.

7. The process as claimed in claim 6, wherein said positioning of the annular anchoring structures comprises:
radially expanding a plurality of axially internal sectors and a plurality of axially external sectors of each half-drum so as to delimit each annular retaining seat until receiving its annular anchoring structure.

8. The process as claimed in claim 7, wherein, during the radial expansion of the axially external sectors, the free ends of the turning-up levers rest on tailpieces of said axially external sectors and follow radial expansion movement thereof.

9. The process as claimed in claim 7, wherein, in a starting action of moving each support close to its associated half-drum, the free ends of the turning-up levers traverse an inclined surface carried by the axially external sectors.

10. The process as claimed in claim 1, comprising:
arranging a crown structure around the carcass sleeve disposed on the shaping drum, wherein, during the step of giving the toroidal conformation to the carcass sleeve, a radially external portion of the carcass sleeve is brought against the crown structure.

11. The process as claimed in claim 1, wherein said threaded shaft carries two lead screw nuts each rigidly connected to a respective one of the supports, for moving the half-drums along an axial direction with respect to the shaping drum during said step of giving the toroidal conformation to the carcass sleeve.

12. The process as claimed in claim 1, wherein said rotation of said threaded shaft for lifting the free ends of said turning-up levers moves each support close to its associated half-drum along an axial direction with respect to shaping drum.

* * * * *

UNITED STATES PATENT AND TRADEMARK OFFICE
CERTIFICATE OF CORRECTION

PATENT NO. : 9,724,886 B2  
APPLICATION NO. : 14/009910  
DATED : August 8, 2017  
INVENTOR(S) : Mauro Bigogno Page 1 of 1

It is certified that error appears in the above-identified patent and that said Letters Patent is hereby corrected as shown below:

On the Title Page

Item (75), "Mauro Bignogno" should read --Mauro Bigogno--.

Item (57), Line 12, "moving the half-drums dose to each other" should read --moving the half-drums close to each other--.

Signed and Sealed this  
Sixth Day of March, 2018

Andrei Iancu  
*Director of the United States Patent and Trademark Office*